United States Patent
Futami (10) Patent No.: US 7,761,013 B2
(45) Date of Patent: Jul. 20, 2010

(54) OPTICAL RECEIVER HAVING BIAS CIRCUIT FOR AVALANCHE PHOTODIODE WITH WIDE DYNAMIC RANGE

(75) Inventor: Ryutaro Futami, Yokohama (JP)

(73) Assignee: Sumitomo Electric Industries Ltd., Osaka (JP)

( * ) Notice: Subject to any disclaimer, the term of this patent is extended or adjusted under 35 U.S.C. 154(b) by 883 days.

(21) Appl. No.: 11/449,029

(22) Filed: Jun. 8, 2006

(65) Prior Publication Data

US 2006/0280511 A1    Dec. 14, 2006

(30) Foreign Application Priority Data

Jun. 14, 2005    (JP) ............................. P2005-173993

(51) Int. Cl.
*H04B 10/06* (2006.01)
*H04B 10/12* (2006.01)

(52) U.S. Cl. .................. 398/209; 398/202; 398/208; 398/210; 398/212; 398/213

(58) Field of Classification Search .................. 398/202, 398/208, 209, 210, 212, 213
See application file for complete search history.

(56) References Cited

U.S. PATENT DOCUMENTS

| | | | | |
|---|---|---|---|---|
| 5,625,181 A | * | 4/1997 | Yasuda et al. | 250/214 A |
| 6,894,266 B2 | * | 5/2005 | Richard et al. | 250/214 R |
| 2003/0066947 A1 | * | 4/2003 | Alwan et al. | 250/206 |
| 2005/0001150 A1 | * | 1/2005 | Yonemura | 250/214 R |
| 2007/0057160 A1 | * | 3/2007 | Kaku et al. | 250/214 R |
| 2007/0058989 A1 | * | 3/2007 | Kaku et al. | 398/209 |

FOREIGN PATENT DOCUMENTS

| | | |
|---|---|---|
| JP | P11-186971 | 7/1999 |
| JP | 2004-289206 | 10/2004 |

* cited by examiner

*Primary Examiner*—Ken N Vanderpuye
*Assistant Examiner*—Daniel G Dobson
(74) *Attorney, Agent, or Firm*—Smith, Gambrell & Russell, LLP (57) ABSTRACT

An optical receiver is provided as a device capable of detecting a small optical power with satisfactory accuracy and detecting the optical power in a wide dynamic range. In the optical receiver a bias generator applies a variable voltage to an avalanche photodiode (APD). First and second current sensors generate first and second detected signals according to a photocurrent. A controller calculates an optical power, using either one of the detected signals. The first current sensor includes a current mirror circuit and generates a first detected signal by measuring an electric current proportional to the photocurrent. The second current sensor is disposed between the bias generator and the current mirror circuit, and the maximum of the photocurrent detectable by this second current sensor is greater than the maximum of the photocurrent detectable by the first current sensor.

8 Claims, 5 Drawing Sheets

Fig.5 ations laid open as JP-H11-
OPTICAL RECEIVER HAVING BIAS CIRCUIT FOR AVALANCHE PHOTODIODE WITH WIDE DYNAMIC RANGE

BACKGROUND OF THE INVENTION

1. Technical Field

The present invention relates to an optical receiver and, particularly, to an optical receiver using an avalanche photodiode.

2. Related Prior Art

For preventing an avalanche photodiode (APD) from being broken by overcurrent, there are known optical receivers configured to detect the optical power of input light received by the APD and to control the bias voltage applied to the APD.

The Japanese patent application laid open as JP-H11-186971A or the Japanese patent application laid open as JP-2004-289206A discloses a circuit for letting a current mirror circuit produce a mirrored current which reflects a photocurrent flowing in the APD, and for converting this mirrored current into a voltage. An analog-to-digital converter (A/D-C) converts this voltage into a digital signal and the bias voltage supplied to the APD is controlled based thereon.

Normally, the optical receiver is connected to a host system and is configured to output information about the optical power of the input light received by the APD, to the host system. For this purpose, the optical receiver calculates the optical input power from the aforementioned digital signal. In order to enhance the detection accuracy at low optical power, it is preferable to increase the resistance of a sensing resistor.

However, an input voltage range that can be converted into a digital signal by A/D-C is dependent on a reference voltage supplied to the A/D-C, and the increase in the resistance of the current sensing resistor will result in increase of the input into the A/D-C, which causes saturation of the output of the A/D-C. Conversely, if the resistance of the current sensing resistor is decreased in order to widen the detection range of the optical input power, the optical detection accuracy will be lowered at low optical powers.

Therefore, the present invention provides an optical receiver that accurately detects low optical powers and has a wide dynamic range of optical detection.

SUMMARY OF THE INVENTION

An aspect of the present invention relates to an optical receiver circuit having an avalanche photodiode. This optical receiver comprises: an avalanche photodiode for receiving an optical signal to generate a photocurrent; a bias generator for applying a variable direct current voltage to the avalanche photodiode; a bias generator for supplying a bias voltage to the avalanche photodiode; a first current sensor having a first current detectable range and configured to detect the photocurrent; a second current sensor having a second detectable range wider than the first detectable range and configured to detect the photocurrent; and a controller for controlling the bias voltage based on the photocurrent detected by the first or second current sensor.

The first current sensor has the first detectable range, and the second current sensor has the second detectable range wider than the first detectable range. The controller controls the bias generator as follows: when a power of the optical signal determined based on the photocurrent detected by the first current sensor is less than a predetermined value, the controller controls the bias generator so as to keep the bias voltage constant based on the photocurrent detected by the first current sensor; when the power of the optical signal is equal to or larger than the predetermined value, the controller controls the bias generator so as to decrease the bias voltage based on the photocurrent detected by the second current sensor.

In another mode the controller determines the power of the optical signal based on the photocurrent detected by the second current sensor, and controls the bias generator as follows: when the determined power is larger than a predetermined value, the controller controls the bias generator so as to decrease the bias voltage based on the photocurrent detected by the second current sensor; when the power of the optical signal is below the predetermined value, the controller controls the bias generator so as to keep the bias voltage constant based on the photocurrent detected by the first current sensor.

Here the first current sensor may be a current mirror circuit having a first current path connected to the avalanche photodiode for the photocurrent to flow on, and a second current path for a current reflecting the photocurrent to flow on. The detectable range of the first current sensor can be regulated by adjusting the mirror ratio of this current mirror circuit.

The bias voltage maintained constant upon the optical power being less than the predetermined value is preferably a bias voltage corresponding to a current multiplication factor that maximizes the reception sensitivity of the avalanche photodiode. If the bias voltage is increased simply to increase the current multiplication factor, noise will also increase, thereby lowering the maximum reception sensitivity, i.e., the minimum detectable optical power.

Another aspect of the present invention relates to a method of controlling a bias voltage of an avalanche photodiode. This method is a control method comprising: (a) detecting a photocurrent generated by an avalanche photodiode, by means of first and second current sensors; (b) calculating a power of an optical signal received by the avalanche photodiode based on the detected photocurrent; (c) performing the following control: when the calculated power is less than a predetermined value, a bias voltage applied to the avalanche photodiode is kept constant based on the photocurrent detected by the first current sensor; when the calculated optical power is equal to or larger than the predetermined value, the bias voltage is decreased based on the photocurrent detected by the second current sensor.

Since the second current sensor has a dynamic range set wider than that of the first current sensor, it can follow input powers of the optical signal and can protect the avalanche photodiode from transient current. On the other hand, the first current sensor enables control of the bias voltage with higher accuracy for low optical input powers.

DESCRIPTION OF THE PREFERRED EMBODIMENTS

The preferred embodiments of the present invention will be described below with reference to the accompanying drawings. In the accompanying drawings identical or equivalent elements will be denoted by the same reference symbols.

First Embodiment

Figure 1:
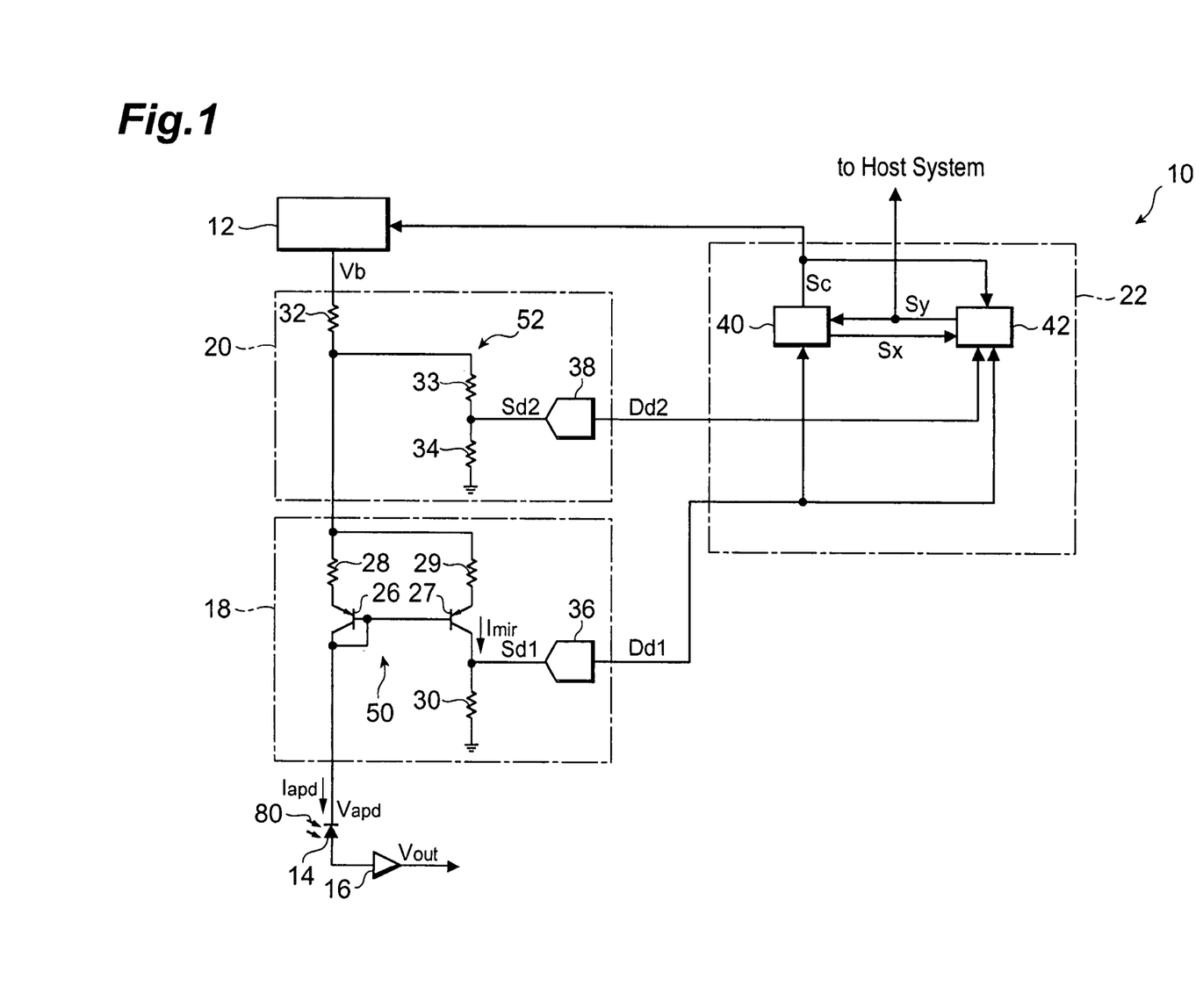
FIG. 1 is a circuit diagram showing the configuration of an optical receiver according to the first embodiment.

FIG. 1 is a circuit diagram showing the configuration of an optical receiver according to the first embodiment. The optical receiver 10 has a bias generator 12, an avalanche photodiode (which will be referred to hereinafter as "APD") 14, a trans-impedance amplifier 16, a first current sensor 18, a second current sensor 20, and a controller 22.

The bias generator 12 is a voltage source that applies a voltage Vb to the APD 14 in the reverse direction. The output Vb is determined according to a control signal Sc sent from the controller 22. As guided from the bias generator 12 through the two current detecting circuits 18, 20, a bias voltage Vapd is applied to the APD 14. The APD 14 detects an optical signal 80 and converts it into a photocurrent Iapd at a multiplication factor M dependent on the bias voltage. The trans-impedance amplifier 16 for converting the photocurrent Iapd into a voltage signal Vout is connected to the anode of the APD 14.

The first and second current sensors 18, 20 are disposed between the bias generator 12 and APD 14. The first and second current sensors 18, 20 generate first and second detected signals Dd1, Dd2 corresponding to the magnitude of the photocurrent Iapd, and supply them to the controller 22. The first current sensor 18 includes a current mirror circuit 50, a sensing resistor 30, and a first analog-to-digital converter (hereinafter referred to as "A/D-C") 36.

The current mirror circuit 50 includes a pair of pnp transistors 26 and 27, and a pair of resistors 28 and 29. The resistor 28 and the transistor 26 form a current path connected to the APD 14, and the resistor 29 and the transistor 27 form another current path. The bases of the two transistors 26, 27 are connected to each other and one ends of the resistors 28, 29 are connected through the second current sensor 20 to the bias generator 12. When the photocurrent Iapd flows through the resistor 28 and transistor 26, a mirrored current Imir proportional to the photocurrent Iapd flows through the resistor 29 and transistor 27. The ratio of the photocurrent Iapd and the mirrored current Imir is sometimes called a mirror ratio. When the mirrored current Imir flows in the sensing resistor 30, a voltage drop occurs in the sensing resistor 30. A first signal Sd1 according to the mirrored current Imir is generated in this manner. The signal Sd1 rises with increase in the optical power, whereas the signal Sd1 drops with decrease in the optical power.

The A/D-C 36 converts the signal Sd1 detected by the resistor 30, into a first detected signal Dd1. In general, the upper limit of input voltage (hereinafter referred to as "maximum input voltage") that can be converted by A/D-C is dependent on a reference voltage given to A/D-C. The reference is approximately 3-5 V for ordinary A/D-Cs. When a voltage higher than the maximum input voltage is fed into A/D-C 36, the output of A/D-C 36 becomes saturated. The maximum photocurrent detectable by the first current sensor 18 is a value of the photocurrent with which the input of A/D-C 36 becomes equal to the maximum input voltage.

The second current sensor 20 includes a limiting resistor 32, a resistive divider 52, and a second A/D-C 38. The limiting resistor 32 is connected between the bias generator 12 and the first current sensor 18, the current mirror circuit. Since the photocurrent Iapd flows in this limiting resistor 32, a voltage drop determined by the photocurrent Iapd occurs between the two ends of the limiting resistor 32, and thus the bias voltage Vapd applied to the APD 14 decreases by this voltage drop from the output Vb of the bias generator 12. The resistive divider 52 includes two resistors 33 and 34, and divides the output of the bias generator 12 reduced by the limiting resistor 32, to generate a signal Sd2. The voltage drop in the limiting resistor 32 increases with increase in the photocurrent Iapd, so as to lower the signal Sd2, whereas the signal Sd2 rises with decrease in the optical power. The A/D-C 38 converts the signal Sd2 into a second detected signal Dd2. As in the case of the A/D-C 36, the maximum input voltage of the A/D-C 38 is also assumed to be approximately 3-5 V. As in the case of the A/D-C 36, when a voltage higher than the maximum input voltage is fed into the A/D-C 38, the A/D-C 38 becomes saturated. Therefore, the second current sensor has to be constructed as follows: a voltage division ratio of the resistive divider 52 is so defined that the input of the sensor becomes equal to the maximum input voltage of the A/D-C 38 without flow of the photocurrent Iapd, i.e., without optical signal 80. Since no voltage drop occurs in the limiting resistor 32 without flow of Iapd, the input of the resistive divider 52 is equal to the output Vb of the bias generator 12.

The resistive divider 52 is provided for preventing an excessive input voltage from being supplied to the A/D-C 38. In general, the bias voltage applied to APD is 20-80 V, while the maximum input voltage of A/D-C 38 is approximately 3-5 V. For this reason, the resistive divider 52 is disposed before the A/D-C 38 so as to prevent the input of A/D-C 38 from becoming too large.

The outputs of the first and second A/D-Cs 36, 38 are connected both to the controller 22. The controller 22 has a control section 40 and a monitoring section 42. The controller 22 calculates the power of the optical signal 80, using either the signal Dd1 or Dd2, and supplies a control signal Sc according to the calculated power to the bias generator 12 to regulate the bias voltage Vapd.

The control section 40 compares the first detected signal Dd1 with a predetermined threshold and notifies the monitoring section 42 of the result of the comparison. This is equivalent to comparing the value of the photocurrent Iapd with a predetermined threshold. Specifically, the control section 40 compares the first detected signal Dd1 with a reference Vr1 and generates a comparison signal Sx indicating the result of the comparison. When Dd1 is less than Vr1, the comparison signal Sx is a low level; when Dd1 is larger than the threshold Vr1, the comparison signal Sx becomes a high level. On the other hand, the control section 40 receives an optical power signal Sy (described later) supplied from the monitoring section 42, and supplies the control signal Sc based on the optical power signal Sy to the bias generator 12 to determine the output Vb.

The monitoring section 42 calculates the power of the optical signal 80, using either the detected signal Dd1 or Dd2, and generates an optical power signal Sy indicating the calculated power. Which detected signal is to be used is determined according to the comparison signal Sx sent from the control section 40. In the present embodiment the optical receiver 10 is used while being connected to an external host system (not shown). The output of the monitoring section 42 is connected to the host system and the optical power signal Sy can be fed to the host system.

A control algorithm for the bias voltage Vapd executed by the controller 22 will be described below. The controller 22 performs a sensitivity priority control when the optical power is small, and performs an overcurrent protection control when the optical power is large. The former is a mode of controlling the bias voltage of APD 14 so as to optimize the sensitivity of APD 14 to the optical power, and the latter a mode of controlling the bias voltage so as to prevent an overcurrent from flowing through the APD 14.

Figure 2:
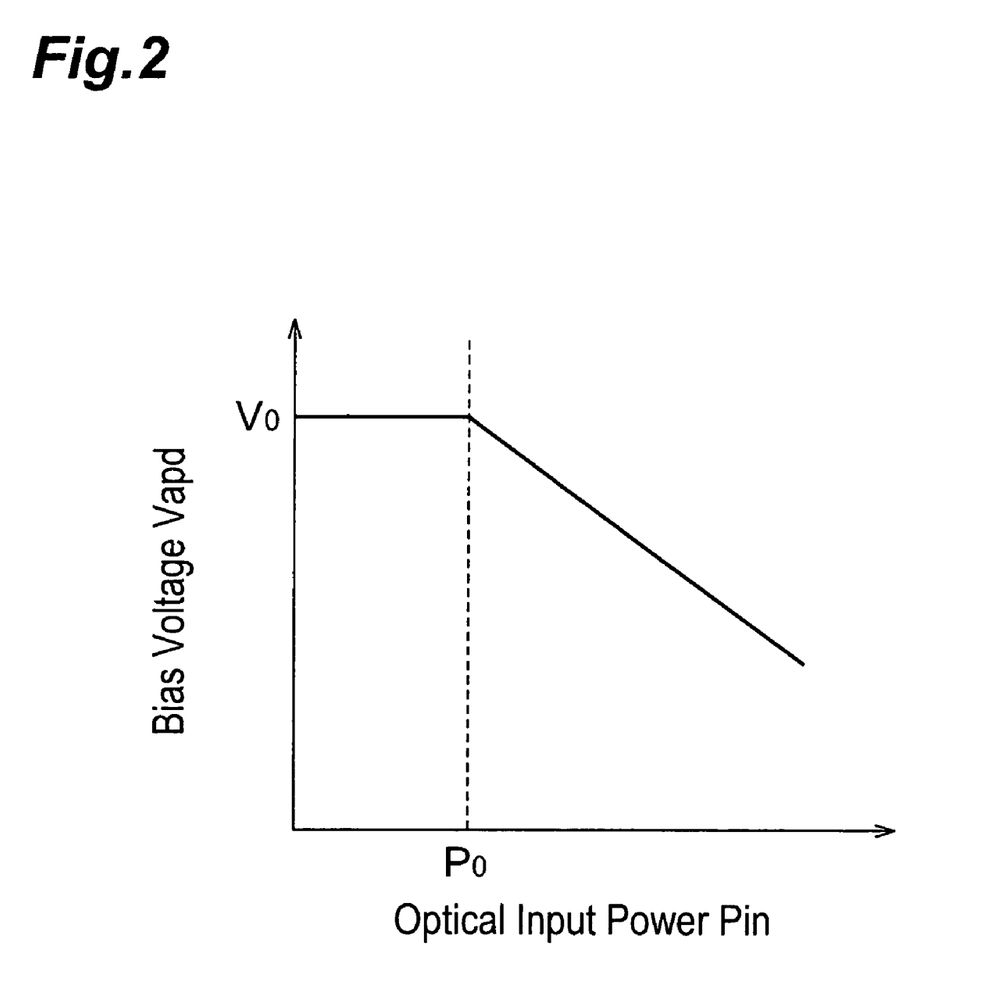
FIG. 2 is a graph showing the relationship between optical power and bias voltage.

FIG. 2 is a graph showing the relationship between optical input power Pin and bias voltage Vapd controlled according to the optical input power by the optical receiver 10 in accordance with the present invention. As shown in FIG. 2, when the optical input power Pin is less than a predetermined value $P_0$, the controller 22 maintains the bias voltage Vapd at a fixed value $V_0$. This is the sensitivity priority control mentioned above. On the other hand, when the optical input power is not less than $P_0$, the controller 22 monotonically decreases the bias voltage Vapd with variation in the optical input power Pin. This is the overcurrent protection control mentioned above.

The controller 22 switches between the control modes in accordance with the comparison signal Sx indicating whether the first detected signal Dd1 is not less than the reference Vr1. Therefore, the reference Vr1 corresponds to the threshold $P_0$ of the optical input power shown in FIG. 2. When the first detected signal Dd1 is less than the reference Vr1, i.e., when the comparison signal Sx is at the low level, the controller 22 calculates the optical power using the first detected signal Dd1, and controls the output Vb based on the calculated value. On the other hand, when the first detected signal Dd1 is not less than the reference Vr1, i.e., when the comparison signal Sx is at the high level, the controller 22 calculates the optical power using the second detected signal Dd2, and regulates the output Vb based on the calculated value. Specifically, with an increase of the optical input power, the controller decreases the output Vb to lower the bias voltage Vapd. Conversely, with a decrease in the optical input power Pin, the controller increases the output Vb to raise the bias voltage Vapd.

The reference voltage Vr1 is set to not more than the value of the detected signal Dd1 corresponding to the maximum of the photocurrent Iapd detectable by the first current sensor 18. Thus, with an increase of the optical signal 80, the detected signal to be used in the calculation of the optical input power is switched from Dd1 to Dd2 before the photocurrent Iapd exceeds the maximum detectable by the first current sensor 18, which prevents inaccurate calculation of the optical power using the saturated detected signal Dd1.

A calculation method of optical power will be described below in detail. The monitoring section 42 selects either the detected signal Dd1 or Dd2 according to the comparison signal Sx and calculates the optical power using the selected detected signal. In the present embodiment the optical power is calculated by two approximate calculations preliminarily programmed in the monitoring section 42: the first approximate calculation is performed when the comparison signal Sx is at the low level; the second approximate calculation is performed when the comparison signal Sx is at the high level.

Figure 3A:
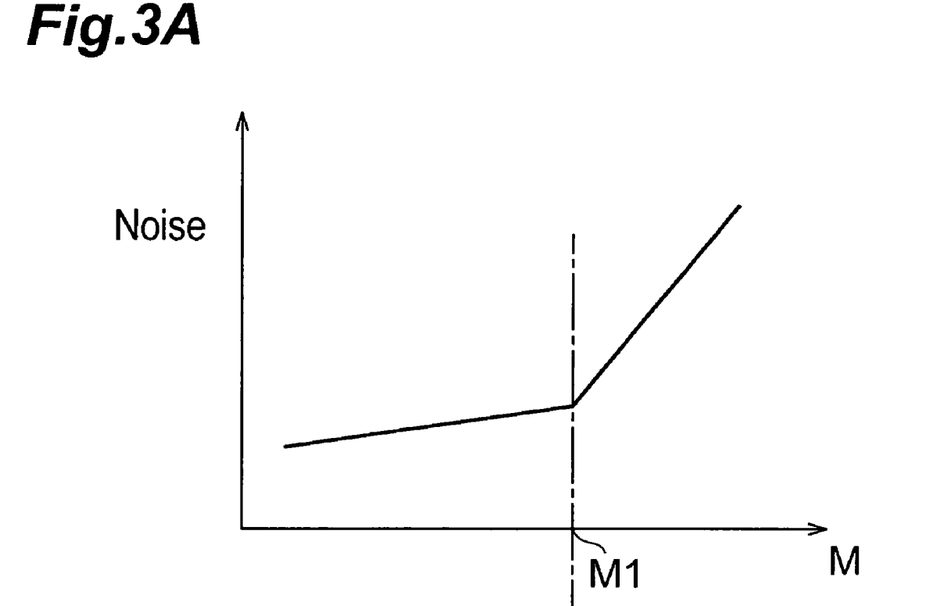
FIG. 3A is a graph schematically showing the relationship between multiplication factor of APD and noise.

The first approximate calculation is to calculate the optical power from the value of the first detected signal Dd1. As described above, the bias voltage Vapd is maintained at the fixed value $V_0$ when the comparison signal Sx is at the low level. This means that the multiplication factor M of APD 12 is set to be a fixed value. This fixed value will be denoted below by M1. M1 is the value of the multiplication factor M at which the minimum detectable power is lowest. Here the minimum detectable power is the minimum power of the optical signal that can be identified by a data decision circuit connected to the rear of the trans-impedance amplifier 16. Therefore, as the minimum detectable power becomes smaller, a smaller optical signal can be detected, and the sensitivity of the optical receiver 10 becomes higher. A sufficient condition for decreasing the minimum detectable power is not to simply increase the multiplication factor M of APD 14 because noise of APD increases with rise of the multiplication factor and it makes the identification of the optical signal difficult. FIG. 3A schematically shows the relationship between the multiplication factor M of APD and the noise. In the APD, the noise rapidly increases when the multiplication factor M becomes larger than a certain value. This value is the aforementioned M1.

Figure 3B:
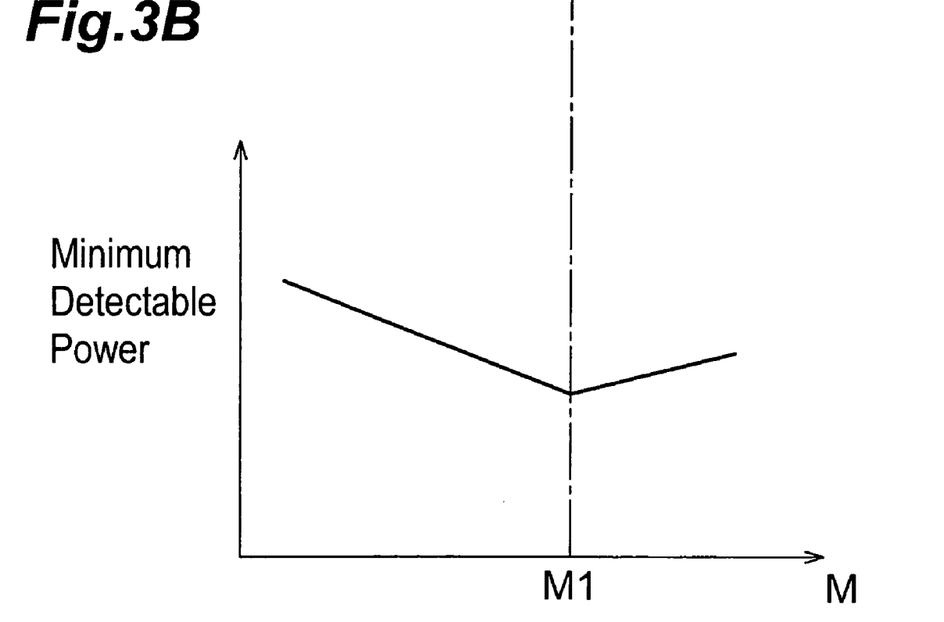
FIG. 3B is a graph schematically showing the relationship between multiplication factor of APD and minimum detectable power.

FIG. 3B schematically shows the relationship between the multiplication factor M of APD and the minimum detectable power. Since the noise rapidly increases with increase of the multiplication factor M over M1 as described above, the minimum detectable power increases to degrade the receiver sensitivity in spite of the increase of the multiplication factor M. Therefore, in order to minimize the minimum detectable power, the multiplication factor of APD 14 is preferably defined to the aforementioned threshold M1. In the first approximate calculation, the photocurrent Iapd is calculated from the first detected signal Dd1 and the optical power is determined based on the photocurrent conversion characteristics of APD 12 at the aforementioned multiplication factor M1. The photocurrent Iapd is calculated by multiplying the signal Dd1 by a constant according to the mirror ratio of the current mirror circuit 50 and the conversion characteristics of the A/D-C 36.

Figure 4:
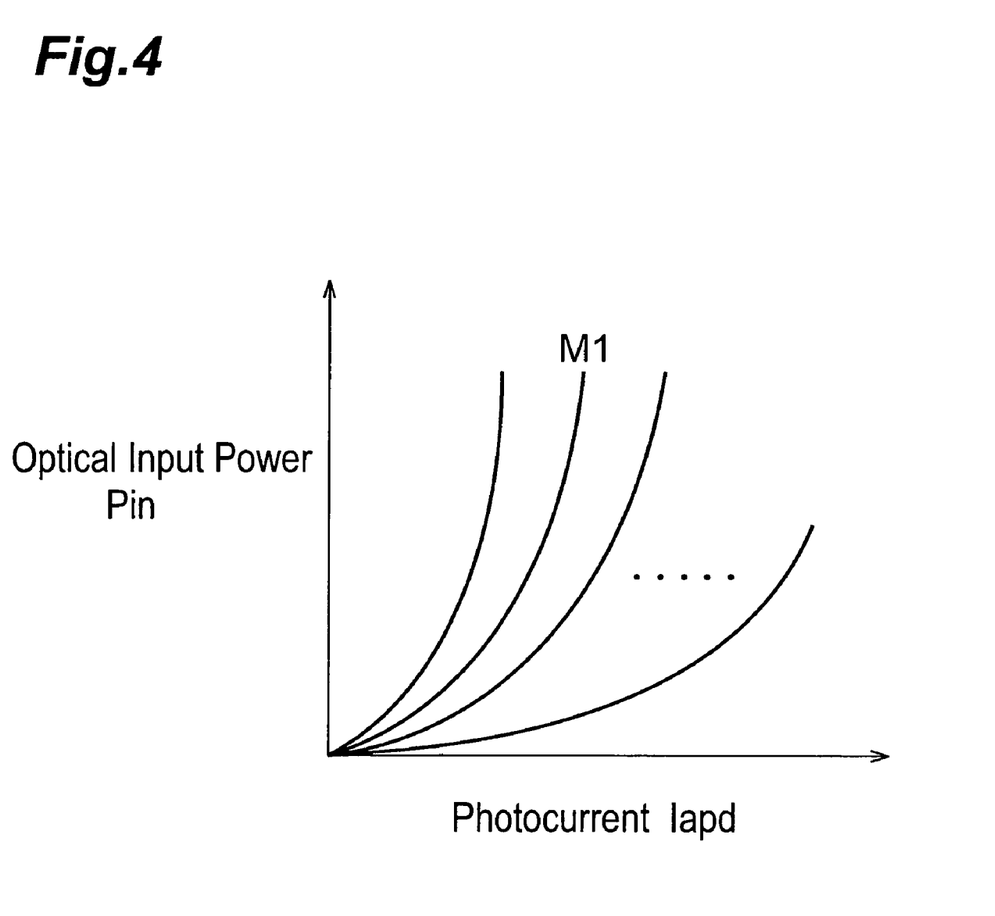
FIG. 4 is a graph exemplifying photoelectric conversion characteristics at various multiplication factors.

FIG. 4 is a graph exemplifying the photoelectric conversion characteristics under a variety of multiplication factors M. As shown in FIG. 4, the optical input power Pin can be approximated by a quadratic function of the photocurrent Iapd;

$$Y=AX^2+BX+C \tag{1}$$

In this equation, Y represents the optical input power Pin, X the photocurrent Iapd, and A, B, and C are coefficients determined according to the photoelectric conversion characteristics under the multiplication factor M1. This approximate equation is determined by preliminarily investigating the photoelectric conversion characteristics of APD 12 and is programmed in the monitoring section 42. The monitoring section 42 puts the photocurrent Iapd calculated from the detected signal Dd1, into Eq (1) to calculate the optical input power.

The optical input power can also be determined from the values of the second detected signal Dd2 and the control signal Sc. As described previously, when the comparison signal Sx is the high level, the bias voltage Vapd varies according to the optical input power and thus the multiplication factor M of APD 12 also varies. Since the optical input power needs to be calculated in consideration of both the photocurrent Iapd and the multiplication factor M, the second approximate calculation is to calculate the multiplication factor M as well as the photocurrent Iapd and determine the optical input power using them. The photocurrent Iapd is calculated by dividing the voltage drop in the limiting resistor 32 by a resistance thereof. The voltage drop in the limiting resistor 32 is equal to the difference between the output Vb of the bias generator 12 and the input voltage of the resistive divider 52. The output Vb is determined from the control signal Sc supplied from the control section 40. For example, the monitoring section 42 includes a storage device (not shown) that stores data (calculation formula or Look Up Table (LUT)) indicating the relationship between control signal Sc and output Vb, and the monitoring section 42 can determine the output Vb corresponding to the present value of the control signal Sc. The input voltage of the resistive divider 52 is calculated from the second detected signal Dd2, using the resistance division ratio. On the other hand, the multiplication factor M is determined based on the bias voltage Vapd. The monitoring section 42 subtracts the voltage drop in the resistor 28 and the emitter-base voltage of the transistor 26 from the input voltage of the resistive divider 52 to calculate the bias voltage Vapd. The monitoring section 42 has a storage device that stores data (calculation formula or LUT) indicating the relationship between bias voltage Vapd and multiplication factor M, and the monitoring section 42 can determine the multiplication factor M corresponding to the bias voltage Vapd.

When the multiplication factor M calculated in this manner is represented by Mcal, the optical input power Pin is determined based on the photoelectric conversion characteristics of APD 12 at the multiplication factor Mcal. The photoelectric conversion characteristics can also be approximated by a quadratic equation below similar to Eq (1);

$$Y=DX^2+EX+F \qquad (2).$$

In this equation, Y represents the optical input power Pin, X the photocurrent Iapd, and D, E, and F coefficients determined according to the photoelectric conversion characteristics under the multiplication factor Mcal. The approximate calculation equation is determined by preliminarily investigating the photoelectric conversion characteristics of APD 12 and is programmed in the monitoring section 42.

The monitoring section 42 calculates the optical input power as described above and thereafter feeds the signal Sy corresponding to the optical input power to the control section 40. The control section 40 generates the control signal Sc based on this signal Sy. An algorithm for generating the control signal Sc will be described below.

First, the relationship between bias voltage Vapd and output Vb will now be studied. Supposing the mirror ratio Imir/Iapd is 1, the relationship of the following equation holds between these voltages.

$$Vb=Vapd+Vbe+(2\times R32+R28)\times Iapd \qquad (3)$$

R32 and R28 are the resistances of the limiting resistor 32 and the resistor 28 inserted in the first current path of the current mirror circuit, respectively, and Vbe the emitter-base voltage of the transistor 26. The third term $(2\times R32+R28)\times Iapd$ represents the voltage drop in the limiting resistor 32 and resistor 28.

As described previously, when the comparison signal Sx is at the low level, the bias voltage Vapd is controlled to be constant to maintain the multiplication factor M1. According to Eq (3), in order to keep the bias voltage Vapd constant, the output Vb needs to be regulated so as to cancel the variation of the voltage drop $(2\times R32+R28)\times Iapd$ according to the change in the photocurrent Iapd. In this case, however, the optical input power is low, and thus it is usual that $(2\times R32+R28)\times Iapd$ is sufficiently smaller than Vapd+Vbe, and that the variation of the voltage drop $(2\times R32+R28)\times Iapd$ according to the change in the photocurrent Iapd is ignorable in this region.

The control section 40 has a storage device (not shown) and regulates the output Vb, using first control data stored in this storage device. This first control data is an LUT that stores the control signals Sc in association with the first detected signals Dd1. Each of the values Sc of the control signals stored in the LUT is preliminarily determined so that the multiplication factor of APD 14 becomes M1 when a photocurrent Iapd indicated by a value of Dd1 corresponding to the value Sc flows through the limiting resistor 32. When a photocurrent Iapd corresponding to one Dd1 in the LUT flows, the control section 40 reads the control value Sc corresponding to the Dd1 from the LUT, and the bias generator 12 generates an output Vb according to this control signal Sc, whereby an appropriate bias voltage Vapd is applied to the APD 14 to regulate the multiplication factor to M1. If the LUT lacks the value of Dd1 acquired from A/D-C 36, the control section may generate the control signal Sc, using the value corresponding to the closest Dd1 value or may calculate the control value Sc by interpolation or by extrapolation.

On the other hand, when the comparison signal Sx is at the high level, the bias voltage Vapd is controlled to determine a multiplication factor M that prevents an overcurrent from flowing through the APD 14. The control section 40 regulates the output Vb, using second control data stored in an LUT. Namely, the control section 40 receives the signal Sy, reads the corresponding control value Sc from the LUT, and outputs it to the bias generator 12. The bias generator 12 feeds the output Vb according to this control signal Sc and an appropriate bias voltage Vapd is applied to the APD 14, so as to prevent an overcurrent from flowing through the APD 14. If the LUT lacks the optical power signal Sy acquired from the monitoring section 42, the control section may use a control value Sc corresponding to the closest value or may calculate the control value Sc by interpolation or by extrapolation.

The optical receiver 10 is able to detect a small optical power with satisfactory accuracy and to detect the optical power in a wide dynamic range. Since the reference Vr1 is set not to be more than the value corresponding to the maximum photocurrent detectable by the first current sensor 18, the detected signal to be used in the calculation of optical power is switched from Dd1 to Dd2 before the photocurrent exceeds the detectable maximum. Therefore, when the photocurrent is larger than the maximum of the first current sensor 18, the optical power has already been calculated using the second detected signal Dd2. Therefore, the dynamic range of the optical power of the optical receiver 10 can be expanded. Furthermore, the sensing resistor 30 with a large resistance enables the first current sensor 18 to have sufficient accuracy even for small input powers.

The resistance of the sensing resistor 30 is set according to the input range of the optical receiver 10. For example, in a case where the input range of the optical receiver 10 is −30 dBm to 0 dBm and where the current sensor 18 detects the optical power of not more than −10 dBm, the resistance of the sensing resistor 30 is preferably set to about 3 kΩ.

Second Embodiment

Figure 5:
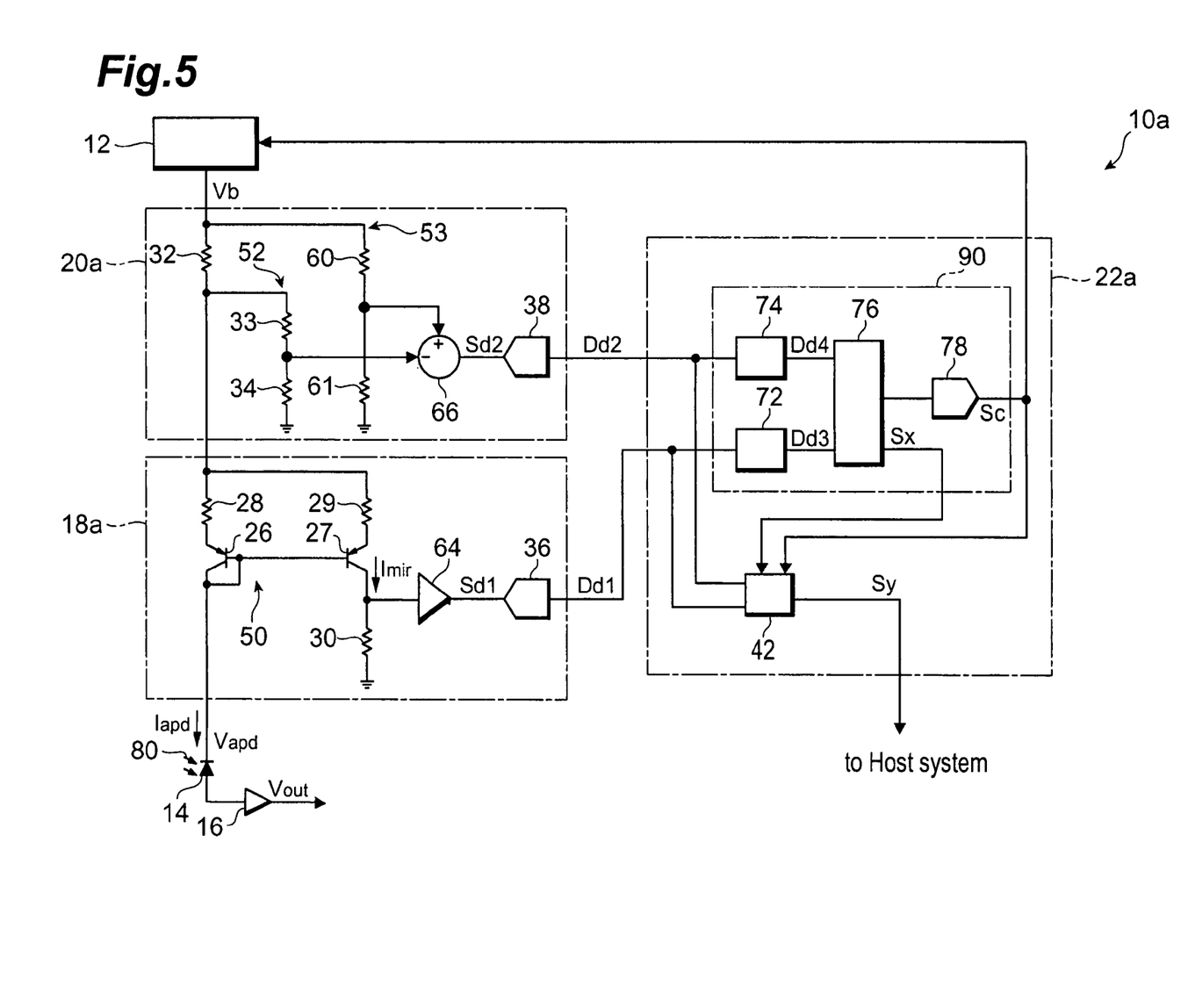
FIG. 5 is a circuit diagram showing the configuration of an optical receiver according to the second embodiment.

FIG. 5 is a circuit diagram showing the configuration of an optical receiver according to the second embodiment. This optical receiver 10a is different from the optical receiver 10 in that the optical receiver 10a has first and second current sensors 18a, 20a resulting from modification of those 18, 20, instead thereof, and in that it has a new controller 22a instead of the controller 22.

The first current sensor 18a has an amplifier 64 between the sensing resistor 30 and the A/D-C 36. The amplifier 64 amplifies the voltage generated in the sensing resistor 30 at a predetermined amplification factor to generate a signal Sd1. The A/D-C 36 converts the signal Sd1 into a first detected signal Dd1 and feeds it to the controller 22a.

The output of the amplifier is clamped at a supply voltage supplied to the amplifier. Namely, the amplifier serves as an amplitude limiting circuit. Assuming that the supplied voltage of amplifier 64 is approximately 3-5 V, the saturated output of amplifier 64 is also approximately 3-5 V. The second current sensor 20a is configured by adding a second resistive divider 53 and a subtraction circuit 66 to the current detecting circuit 20. The second resistive divider 53 includes a third resistor 60 and a fourth resistor 61 and has the same division ratio as the first resistive divider 52. The second resistive divider 53 generates a voltage by dividing the output Vb of the bias generator 12, and feeds the generated voltage to the plus input terminal of the subtraction circuit 66. The minus input terminal of the subtraction circuit 66 is connected to the output of the first resistive divider 52. The subtraction circuit 66 subtracts the output of the first resistive divider 52 from the output of the second resistive divider 53 in this manner to generate a second signal Sd2. The A/D-C 38 converts this signal Sd2 into a second detected signal Dd2 and feeds it to the controller 22a.

Since the division ratios of the first and second resistive dividers 52, 53 are set to be same, the second detected signal Dd2 is equivalent to the voltage drop in the limiting resistor 32. Since the voltage drop in the limiting resistor 32 increases with increase in the photocurrent Iapd, the detected signal Dd2 rises with increase in the optical power, whereas it drops with decrease in the optical power. This behavior is the same as that of the first detected signal Dd1. However, the second current sensor 20a is configured so as not to exceed the maximum input voltage of A/D-C 38 even when a photocurrent higher than the maximum photocurrent detectable by the first current sensor 18a occurs. This configuration is realized by setting the resistances of the sensing resistors 30, 32 in the current sensors 18a and 20a.

The controller 22a will be described below in detail. The control section 90 has a first storage device 72, a second storage device 74, a comparator 76, and a digital-to-analog converter (hereinafter referred to as "D/A-C") 78.

Just as in the first embodiment, the controller 22a controls the bias voltage Vapd so that the bias voltage Vapd of APD 14 indicates the change as shown in FIG. 2, against optical input power Pin. The controller 22a has a configuration obtained by replacing the control section 40 in the controller 22 with the control section 90. The control section 40 is configured to switch between the control modes of the bias voltage Vapd based on the first detected signal Dd1, whereas the control section 90 of the present embodiment is configured to switch between the control modes of the bias voltage Vapd based on the second detected signal Dd2. The control section 40 controls the bias voltage Vapd based on the optical power signal Sy from the monitoring section 42 at large optical powers, whereas the control section 90 of the present embodiment controls the bias voltage Vapd based on the second detected signal Dd2 at large optical powers.

The first storage device 72 stores the first control data used in the first embodiment. The first storage device 72 receives the first detected signal Dd1 from A/D-C 36 and outputs a control signal Dd3 corresponding to the value of the received signal Dd1. As described in the first embodiment, this control signal Dd3 is preliminarily determined so that the multiplication factor of APD 14 becomes the aforementioned optimal value, M1. This control signal Dd3 is fed to the comparator 76.

The second storage device 74 stores the second control data used in the first embodiment. The second storage device 74 receives the second detected signal Dd2 from the A/D-C 38 and outputs a control signal Dd4. As described in the first embodiment, this control signal Dd4 is determined so that the multiplication factor M of APD 14 becomes a value for preventing an overcurrent from flowing through the APD. This digital control signal Dd4 is supplied to the comparator 76.

The comparator 76 compares the control signal Dd4 with a predetermined threshold and notifies the monitoring section 42 of the result of the comparison. Specifically, the comparator 76 compares the control signal Dd4 with a reference voltage Vr2 and generates a comparison signal Sx according to the result of the comparison. In the present embodiment, when Dd4 is less than Vr2, the comparison signal Sx is at a low level; when Dd4 is not less than Vr2, the comparison signal Sx is at a high level. The comparison signal Sx is fed to the monitoring section 42.

The monitoring section 42 calculates the optical power, using the first detected signal Dd1 when the comparison signal Sx is at the low level, or using the second detected signal Dd2 when Sx is at the high level. The algorithm for the calculation is the same as in the first embodiment. The monitoring section 42 generates an optical power signal Sy according to the calculated optical power, and feeds the signal from an output terminal 42d to a host system. The comparator 76 supplies the control signal Dd3 to the D/A-C 78 when the comparison signal Sx is at the low level, or supplies the control signal Dd4 to the D/A-C 78 when Sx is at the high level. The D/A-C 78 converts the detected signal Dd3 or Dd4 to generate a control signal Sc and supplies to it the bias generator 12. As a result, the bias voltage Vapd is controlled as shown in FIG. 2, in the same manner as in the first embodiment.

In the present embodiment, as described above, the magnitude of optical power is determined based on the detected signal Dd2, instead of the detected signal Dd1. The controller 22a switches between the control modes in accordance with the comparison signal Sx indicating whether the control signal Dd4 corresponding to the first detected signal Dd2 is not less than the reference Vr2. Therefore, the reference Vr2 corresponds to the threshold $P_0$ of the optical input power shown in FIG. 2.

The optical receiver 10a of the present embodiment is assumed to receive an optical input with a larger power than the optical receiver 10 of the first embodiment does. For example, the optical input range of the optical receiver 10a is as wide as 1 μW-1 mW, and when the optical power Pin is from 1 μW inclusive to 10 μW exclusive, the multiplication factor M of APD 14 is fixed to 10, and when Pin is from 10 μW to 1 mW inclusive, the bias voltage Vapd is decreased with increase in the optical power Pin so that the multiplication factor M equals 10 at Pin=10 μW and 1 at Pin=1 mW. The input voltage range of A/D-C 36 is assumed to be 0-3 V.

Supposing that the resistance of the sensing resistor 30 is 30 kΩ, the input voltage of A/D-C 36 is 0.3 V at the optical power of 1 μW, 3.0 V at 10 μW, and 30.0 V at 1 mW; therefore, the present embodiment uses the amplifier 64 as an amplitude limiting circuit. When a supply voltage of 3 V is supplied to the amplifier 64, the output of the amplifier 64 is at most 3 V. For example, where the amplification factor of the amplifier 64 is 10 and the resistance of the sensing resistor 30 3 kΩ, the input voltage of the amplifier 64 is 0.03 V at the optical power Pin of 1 μW, 0.3 V at 10 μW, and 3.0 V at 1 mW. Here the input voltage of A/D-C 36, i.e., the output of the amplifier 64 is 0.3 V, 3.0 V, and 3.0 V, respectively. As described above, in addition to the advantage in the first embodiment, the optical receiver 10a of the present embodiment has the advantage of capability of preventing breakage of A/D-C 36 because the amplifier 64 limits the input of A/D-C 36 to the input breakdown voltage or less. This can expand the range of optical power detectable by the optical receiver 10a.

The present invention was described above in detail based on the embodiments thereof. It is, however, noted that the present invention is by no means limited to the above embodiments. The present invention can be modified in various ways without departing from the spirit and scope thereof.

For example, the above embodiments are provided with the second current sensor 20 or 20a disposed between the bias generator 12 and the current mirror circuit 18 or 18a, but the second current sensor may be disposed between the current mirror circuit 18 or 18a and the APD 14. When the optical input power is not less than $P_0$, the bias voltage Vapd is monotonically decreased with increase in the optical power Pin. However, as long as no overcurrent flows through APD 14, the bias voltage Vapd may be maintained at a fixed value (e.g., aforementioned $V_0$) even if the optical input power is not less than $P_0$. Even in the case where the bias voltage Vapd is decreased with increase in the optical input power, a lower limit may be set for the bias voltage Vapd, in order to prevent overload characteristics from deteriorating at extremely high powers.

The first embodiment is arranged to determine whether the optical input power is not less than the threshold based on the first detected signal Dd1, but this determination may be made based on the second detected signal Dd2. On the other hand, the second embodiment is arranged to determine whether the optical input power is not less than the threshold based on the control signal Dd4, but this determination may also be made based on the first control signal Dd3. The value of the control signal Dd3 changes according to the detected signal Dd1 in order to cancel the variation of the voltage drop in the limiting resistor 32 according to the change in the photocurrent. Therefore, comparing the control signal Dd3 with the predetermined reference is equivalent to comparing the value of the photocurrent with a predetermined threshold. This determination may also be conducted by comparing the detected signal Dd1 or Dd2 with a threshold in the same manner as in the first embodiment.

The second embodiment uses the two storage devices 72, 74 for storing the first and second control data, but they may be replaced by a single storage device, thereby simplifying the circuit configuration. The detected signals Dd1, Dd2 outputted from the A/D-Cs 36, 38 both are supplied to the single storage device. This storage device outputs the control values Dd3, Dd4 as a series of data to the comparator 78. The comparator 78 generates the control signal Sc, using the first half or the second half of this data. The first embodiment may be provided with an amplitude limiting circuit, e.g., amplifier 64 between the current sensing resistor 30 and the first A/D-C 36 as the second embodiment is.

What is claimed is:

1. An optical receiver circuit with an avalanche photodiode (APD) for receiving an optical signal with power and outputting a photocurrent corresponding to the optical signal, comprising:
   a bias generator for supplying a bias voltage to said APD;
   a first current sensor having a first detectable range and configured to detect the photocurrent, said first current sensor outputting a first signal that increases as the photocurrent increases;
   a second current sensor having a second detectable range wider than the first detectable range and configured to detect the photocurrent, said second current sensor outputting a second signal that decreases as the photocurrent increases; and
   a controller for controlling the bias generator based on the photocurrent detected by the first or second current sensor, wherein
   the controller sets the bias voltage to be constant when the power of the optical signal that is calculated based on the first signal output from the first current sensor is less than a predetermined value, and
   the controller decreases the bias voltage based on the second signal output from the second current sensor when the power of the optical signal is equal to or larger than the predetermined value.

2. The optical receiver circuit according to claim 1, wherein the first current sensor includes a current mirror circuit having first and second current paths, said first current path being connected to said APD to conduct the photocurrent thereon, said second current path providing an electric current proportional to the photocurrent.

3. The optical receiver circuit according to claim 1, wherein the bias voltage set as constant by the controller defines a multiplication factor of the APD to maximize a reception sensitivity thereof.

4. The optical receiver circuit according to claim 1, wherein the controller includes a storage device, a look-up table for associating the power of the optical signal with the photocurrent, and the bias voltage.

5. An optical receiver circuit with an avalanche photodiode (APD) for receiving an optical signal with power and outputting a photocurrent corresponding to the optical signal, comprising:
   a bias generator for supplying a bias voltage to said APD;
   a first current sensor having a first detectable range and configured to detect the photocurrent, said first current sensor outputting a first signal that increases as the photocurrent increases;
   a second current sensor having a second detectable range wider than the first detectable range and configured to detect the photocurrent, said second current sensor outputting a second signal that decreases as said photocurrent increases; and
   a controller for controlling the bias generator, based on the photocurrent detected by the first or second current sensor, wherein
   the controller decreases the bias voltage based on the second signal output from the second current sensor when the power of the optical signal that is calculated based on the second signal is larger than a predetermined value, and
   the controller sets the bias voltage to be constant based on the first signal output from the first current sensor when the power of the optical signal is equal to or smaller than the predetermined value.

6. The optical receiver circuit according to claim 5, wherein the first current sensor includes a current mirror circuit having first and second current paths, said first path being connected to said APD to conduct the photocurrent thereon, said second current path providing an electric current proportional to the photocurrent.

7. The optical receiver circuit according to claim 5, wherein the bias voltage set as constant by the controller defines a multiplication factor of the APD to maximize a reception sensitivity thereof.

8. The optical receiver circuit according to claim 5, wherein the controller includes a storage device for storing a look-up table that relates the power of the optical signal with the photocurrent and the bias voltage.

* * * * *